(12) United States Patent
Rinn (10) Patent No.: US 7,548,321 B2
(45) Date of Patent: Jun. 16, 2009

(54) METHOD FOR ENHANCING THE MEASURING ACCURACY WHEN DETERMINING THE COORDINATES OF STRUCTURES ON A SUBSTRATE

(75) Inventor: Klaus Rinn, Heuchelheim (DE)

(73) Assignee: Vistec Semiconductor Systems GmbH, Weilburg (DE)

( * ) Notice: Subject to any disclaimer, the term of this patent is extended or adjusted under 35 U.S.C. 154(b) by 266 days.

(21) Appl. No.: 11/803,635

(22) Filed: May 15, 2007

(65) Prior Publication Data

US 2007/0268495 A1 Nov. 22, 2007

(30) Foreign Application Priority Data

May 16, 2006  (DE)  ........................ 10 2006 023 150
Apr. 16, 2007  (DE)  ........................ 10 2007 018 115

(51) Int. Cl.
*G01B 11/02* (2006.01)
(52) U.S. Cl. .................................................... 356/500
(58) Field of Classification Search ................ 356/496, 356/498, 500
See application file for complete search history.

(56) References Cited

U.S. PATENT DOCUMENTS

| | | | |
|---|---|---|---|
| 5,386,294 A | * | 1/1995 | Ototake et al. .............. 356/401 |
| 5,469,260 A | | 11/1995 | Takagi et al. ................ 356/358 |
| 6,008,902 A | | 12/1999 | Rinn ........................... 356/349 |
| 6,160,628 A | * | 12/2000 | Inoue .......................... 356/500 |
| 6,920,249 B2 | | 7/2005 | Rinn et al. ................... 382/199 |
| 7,027,143 B1 | | 4/2006 | Stokowski et al. ....... 356/237.2 |
| 7,336,369 B2 | * | 2/2008 | Eckes et al. ................. 356/500 |
| 2002/0186879 A1 | | 12/2002 | Hemar et al. ............... 382/149 |
| 2006/0087659 A1 | * | 4/2006 | Schlucter ..................... 356/500 |
| 2006/0126916 A1 | * | 6/2006 | Kokumai ..................... 382/151 |

FOREIGN PATENT DOCUMENTS

| | | |
|---|---|---|
| DE | 196 37 777 | 11/1997 |
| DE | 100 47 211 A1 | 5/2002 |
| JP | 2001012904 A * | 1/2001 |

OTHER PUBLICATIONS

Dr. Carola Bläsing: "Pattern Placement Metrology for Mask Making," at the Semicon Education Program Convention in Geneva, Mar. 31, 1998, (11 pgs).

* cited by examiner

*Primary Examiner*—Michael A Lyons
(74) *Attorney, Agent, or Firm*—Davidson, Davidson & Kappel, LLC (57) ABSTRACT

A method for the high-precision measurement of coordinates on a substrate is disclosed. The substrate is placed on a stage moveable in X/Y coordinate directions. First, a plurality of images of a structure on a substrate are imaged by means of a 2-dimensional detector during the relative movement of a measuring objective in Z coordinate direction and the simultaneous movement of the stage in X and Y coordinate directions.

9 Claims, 8 Drawing Sheets

METHOD FOR ENHANCING THE MEASURING ACCURACY WHEN DETERMINING THE COORDINATES OF STRUCTURES ON A SUBSTRATE

This claims the benefit of German patent application DE 10 2006 023 150.3 filed May 16, 2006 and of German patent application DE 10 2007 018 115.0 filed Apr. 16, 2007, and hereby incorporated by reference herein.

The present invention relates to a method for enhancing the measuring accuracy in determining the coordinates of structures on a substrate. To determine the coordinates of structures, at least one laser interferometer system is provided for determining the position shift of the substrate in at least one spatial direction (X coordinate direction and/or Y coordinate direction). The laser interferometer system together with the substrate is accommodated in a climate chamber.

BACKGROUND

A measuring device as used for measuring structures on wafers and masks used for their manufacture has been disclosed in the paper entitled "Pattern Placement Metrology for Mask Making" by Dr. Carola Bläsing. The paper was held at the Semicon Education Program Convention in Geneva on Mar. 31, 1998. The description given there is the basis for the Leica LMS IPRO coordinate measuring device of the present applicant. For details and the operation and for the construction of the measuring device, the above mentioned publication, and the commercially available LMS IPRO3 and LMS IPRO2 models are explicitly referred to.

The present invention is not limited to the use of those measuring systems as they are disclosed in the paper by Dr. Carola Bläsing entitled "Pattern Placement Metrology for Mask Making". In principle, any structure is suitable which comprises an objective moveable in the Z coordinate direction and a stage moveable in the X coordinate direction and Y coordinate direction on which the substrate to be inspected is placed. The structures imaged by the objective are registered by a CCD chip or any other suitable detector so that they can be evaluated by a computer system.

Since the present invention can be advantageously used with such a measuring device and will be primarily described with reference to such a measuring device, without prejudice to its general applicability, this measuring device will be described in the following with reference to annexed FIG. 1. The well-known measuring device 1 is for measuring structures 31 and their coordinates on a sample 30, such as masks and wafers. In the context of the present application, the terms "sample", "substrate" and the general term "object" are to be regarded as synonymous. In the production of semiconductor chips arranged on wafers with ever increasing integration the structural widths of the individual structures 31 become ever smaller. As a consequence the requirements as to the specification of coordinate measuring devices used as measuring and inspection systems for measuring the edges and the positions of structures 31 and for measuring structural widths become ever more stringent. Optical sampling techniques are still favored in these measuring devices even though the required measuring accuracy (currently in the order of a few nanometers) is far below the resolution achievable with the wavelength used (spectral range in the near UV). The advantage of optical measuring devices is that they are substantially less complicated in structure and easier to operate when compared to systems with different sampling, such as X-ray or electron beam sampling.

The actual measuring system in this measuring device 1 is arranged on a vibration-damped granite block 23. The masks or wafers are placed on a measuring stage 26 by an automatic handling system. This measuring stage 26 is supported on the surface of granite block 23 by air bearings 27, 28. Measuring stage 26 is motor driven and displaceable in two dimensions (X and Y coordinate directions). The corresponding driving elements are not shown. Planar mirrors 9 are mounted on two mutually vertical sides of measuring stage 26. A laser interferometer system 29 is used to track the position of measuring stage 26.

The illumination and imaging of the structures to be measured is carried out by a high-resolution microscope optics with incident light and/or transmitted light in the spectral range of the near UV. A CCD camera serves as a detector. Measuring signals are obtained from the pixels of the CCD detector array positioned within a measuring window. An intensity profile of the measured structure is derived therefrom by means of image processing, for example, for determining the edge position of the structure or the intersection point of two structures intersecting each other. Usually the positions of such structural elements are determined relative to a reference point on the substrate (mask or wafer) or relative to optical axis 20. Together with the interferometrically measured position of measuring stage 26 this results in the coordinates of structure 31. The structures on the wafers or masks used for exposure only allow extremely small tolerances. Thus, to inspect these structures, extremely high measuring accuracies (currently in the order of nanometers) are required. A method and a measuring device for determining the position of such structures is known from German Patent Application Publication DE 100 47 211 A1, and related U.S. Pat. No. 6,920,249, which is hereby incorporated by reference herein. For details of the above position determination explicit reference is made to these documents.

In the example of a measuring device 1 illustrated in FIG. 1, measuring stage 26 is formed as a frame so that sample 30 can also be illuminated with transmitted light from below. Above sample 30 is the illumination and imaging device 2, which is arranged about an optical axis 20. (Auto)focusing is possible along optical axis 20 in the Z coordinate direction. Illumination and imaging means 2 comprises a beam splitting module 32, the above detector 34, an alignment means 33, and a plurality of illumination devices 35 (such as for the autofocus, an overview illumination, and the actual sample illumination). The objective displaceable in the Z coordinate direction is indicated at 21.

A transmitted-light illumination means with a height adjustable condenser 17 and a light source 7 is also inserted in granite block 23, having its light received via an enlarged coupling-in optics 3 with a numerical intake aperture which is as large as possible. In this way as much light as possible is received from light source 7. The light thus received is coupled-in in the coupling-in optics 3 into a light guide 4 such as a fiber-optic bundle. A coupling-out optics 5 which is preferably formed as an achromatic lens collimates the light emitted by light guide 4.

In order to achieve the required nanometer accuracy of the structural measurement it is essential to minimize as far as possible interfering influences from the environment, such as changes in the ambient air or vibrations. For this purpose the measuring device can be accommodated in a climate chamber which controls the temperature and humidity in the chamber with great accuracy (<0.001° C. or <1% relative humidity). To eliminate vibrations, as mentioned above, measuring device 1 is supported on a granite block with vibration dampers 24, 25.

The accuracy of determining the position of the structures is highly dependent on the stability and accuracy of the laser interferometer systems used for determining the X/Y stage position. Since the laser beams of the interferometer propagate in the ambient air of the measuring device, the wavelength depends on the refractive index of this ambient air. This refractive index changes with changes in the temperature, humidity and air pressure, wherein the change in air pressure has the predominant role. Despite the control of temperature and humidity in the climate chamber, the remaining variations of the wavelength are too strong for the required measuring accuracy. An etalon is therefore used to compensate for measuring changes due to changes in the refractive index of the ambient air. In such an etalon a measuring beam covers a fixed metric distance so that changes in the corresponding measured optical length can only be caused by changes in the measuring index of the ambient air. This is how the influence of a change in the refractive index can be largely compensated by the etalon measurement by continuously determining the current value of the wavelength and taking it into account for the interferometric measurement.

Further, the lines of the laser wavelength can be split up, which leads to better detection of the traversal direction of the X/Y stage. Additional interpolation algorithms can be used in the calculation of a position displacement.

To describe the accuracy of the measuring device described, usually the threefold standard deviation ($3\sigma$) of the measured average value of a coordinate is used. In a normal distribution of measuring values, statistically about 99% of the measuring values are within a $3\sigma$ range about the average value. Indications as to repeatability are made by measuring a grid of points in the X and Y coordinate directions, wherein for each direction, after repeated measuring of all points, an average and a maximum $3\sigma$ value can be indicated. In the LMS IPRO measuring device manufactured by Vistec Semiconductor System GmbH of Wetzlar, Germany, for example, the repeatability (maximum value $3\sigma$) of 4-5 nm could be improved to below 3 nm.

From U.S. Pat. No. 5,469,260 an apparatus is known for measuring the position of a one or two dimensionally traversable stage by means of laser interferometry. For this purpose a stationary mirror is attached, for example, on the stationary optical system while the moveable stage carries a mirror along with it. In the well-known manner a laser beam is split in such a way that one part is incident on the stationary mirror while the other part is incident on the mirror which is carried along, and reflected on it. The reflected partial beams are made to interfere with each other wherein, by displacing the interference rings, a relative displacement of the mirror carried along with respect to the stationary mirror can be derived and the amount of this displacement can be determined.

As an example of the above measuring system, in the present document, the position measurement of a wafer support stage during exposure of a wafer through a mask and an optical projection system (stepper) is discussed. Herein the position of the support stage relative to the stationary optical projection system is measured by means of interferometry. Thus, to measure the X and Y coordinates of the stage in a plane two interferometer systems are necessary.

The values (measuring values) of the positions of structures on a substrate obtained by the measurement are affected by a series of error components. The error components originate, for example, from the sequence of the pixel size of the individual pixels of the chip, from apparatus vibrations, from the imprecise stage positioning or an interferometer error. A significant error component of the LMS IPRO is no doubt caused by the interferometer error. This error has a sinusoidal form and varies with the stage position with a period length of $\lambda/4$ (the wavelength of the light used for the interferometer is 632.8 nm. It follows that $\lambda/4=158.2$ nm).

The correction of this error is therefore not precisely possible since it changes as a function of the measuring place on the mask and also over time. This is why the usual method of interferometer correction has reached its limits. The optimum consideration of this error should take the place and time of the measurement into account. This is ideally realized if a measuring logarithm is implemented which simultaneously determines and calculates the interferometer correction during each position measurement.

SUMMARY OF THE INVENTION

A further improvement of the repeatability and therefore of the measuring accuracy of the measuring device described is desirable. Special attention has been paid in the present invention to the laser interferometers used for coordinate measurement of the measuring stage or for determining changes in the coordinates of this measuring stage. It is noted that the present invention is not limited to interferometers in the context of the measuring device described but can generally be used in laser-interferometric measurements.

An object of the present invention is to provide a method for the high-precision measurement of coordinates of structures on a substrate, wherein the errors arising during the measurement for determining the position of the edge are eliminated.

The present invention provides a method for the high-precision measurement of coordinates on a substrate placed on a stage moveable in X/Y coordinate directions. Herein, the recording of a plurality of images of a structure on a substrate is carried out by means of a two-dimensional detector during the relative movement of a measuring objective in the Z coordinate direction and the simultaneous movement of the stage in X/Y coordinate directions. The actual stage position in the X coordinate direction and Y coordinate direction and the position of the measuring objective in the Z coordinate direction are determined during imaging of each individual image. The determination of each associated edge position of the structure is carried out in parallel. A model function is fitted to the thus obtained edge position of the recorded individual images of the structure. Finally, at least one edge position at a predefined focus position is determined with reference to the model function.

That position is referred to as the predefined focus position in which the measuring objective has an optimum focus position with respect to the structure imaged.

An interference function overlaying the model function can be determined from the measuring results to eliminate the effect of the interference function on the measuring values.

The interference function can be composed from a plurality of components, wherein a Fourier analysis of the measuring values is carried out to determine the sinusoidal components of the interference function.

The measure of the relative movement of the measuring objective in the X and Y coordinate directions is between half of a wavelength up to several multiples of the wavelength of the components of the interference function to be expected by Fourier analysis.

The relative movement of the measuring objective in the Z direction comprises several hundreds of nm up to several µm. The recording of the images with the 2-dimensional detector is carried out via at least one measuring window of the 2-dimensional detector. The 2-dimensional detector is a chip of a CCD camera.

A deviation of the edge position and/or of the stage position having a period length of λ/4 or λ/2 is deemed to be due to the interferometer error.

The recording of a plurality of images of a structure on the substrate is thus carried out by means of a 2-dimensional detector (particularly advantageously by means of a CCD camera) during the relative movement of a measuring objective in the Z coordinate direction and the simultaneous movement of the stage in X/Y coordinate directions. The actual stage position is determined during imaging of each individual image.

The above-mentioned climate chamber is a chamber sealed as far as possible with respect to external atmospheric influences, wherein at least one of the following parameters is controlled: composition of the atmosphere in the climate chamber, temperature, pressure and moisture of this atmosphere. Usually, air is chosen as the atmosphere to have its temperature and moisture regulated. Without limiting the general applicability, an air flow will be referred to in the following.

Air pressure fluctuations bring a possible cause of the periodic error (interferometer error) to the fore. Other periodic errors are caused, for example, by the pixel size of the individual pixels of the CCD chip.

BRIEF DESCRIPTION OF THE DRAWINGS

Exemplary embodiments of the invention and their advantages will be described in the following with respect to the accompanying drawings in more detail.

DETAILED DESCRIPTION

Figure 1:
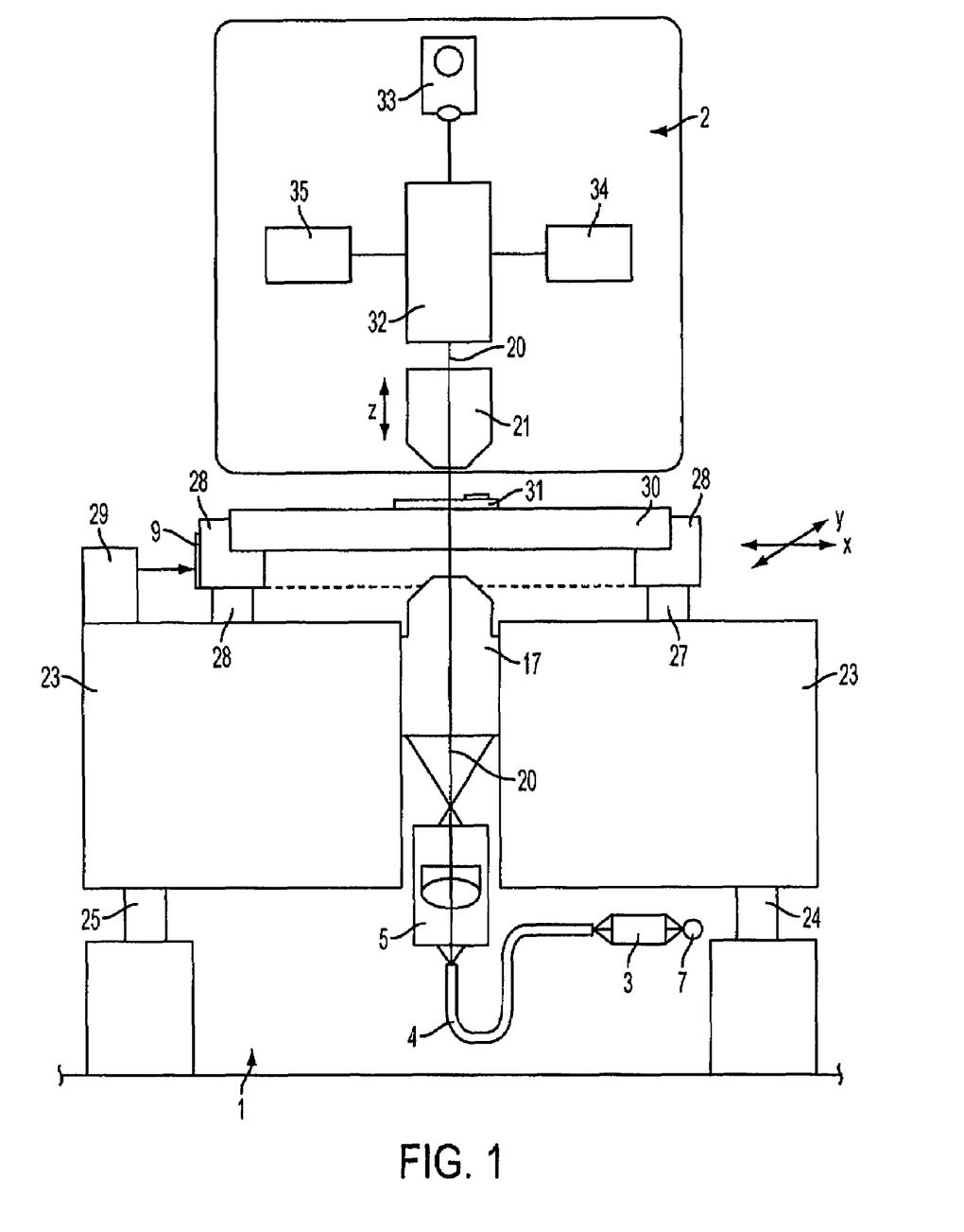
FIG. 1 schematically shows a coordinate measuring device, in which the position measuring method according to the present invention can be advantageously used.

A coordinate measuring device of the type shown in FIG. 1 has already been explained in detail in the introductory portion of the description.

The repeatability or reproducibility of such a coordinate measuring device is usually determined by measuring a measurement grid of 15 by 15 points (measuring area 6 inches, 152×152 mm). The value of the threefold standard deviation (3σ) is typically determined after 20 measurements for the coordinates obtained in the X and Y coordinate directions. The maximum value of this threefold standard deviation represents the repeatability and therefore the machine performance. The measurement is carried out on standard substrates in the factory, wherein a plurality of identical and regularly arranged structures are measured by means of the standard substrate.

If the measurements are made locally on a defined mask position, i.e. in this case the X/Y measuring stage is not traversed, this is an indication for short-term reproducibility. This measurement gives an indication on the repeatability within a short period of time (so-called needle test).

Figure 2A:
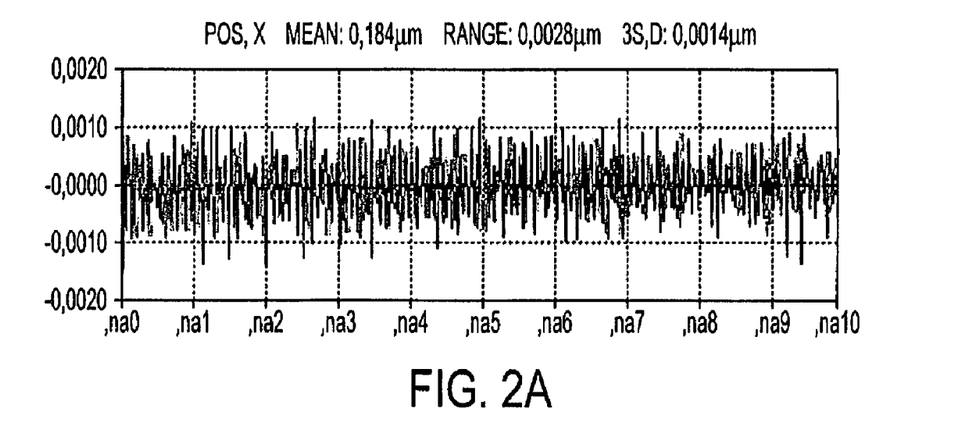
FIG. 2A shows the repeatability of the X coordinate direction in a measuring system according to FIG. 1, wherein the coordinate positions of a 15×15 grid are indicated for nine measuring passes, wherein for better detection of the repeatability, the average value of all nine measuring passes is subtracted from all positions at each grid position.
Figure 2B:
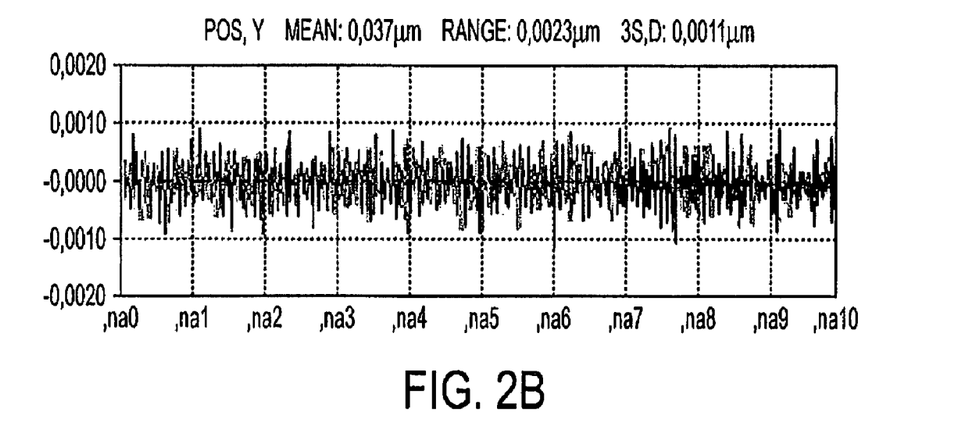
FIG. 2B shows the repeatability of the Y coordinate direction in a measuring system according to FIG. 1, wherein the coordinate positions of a 15×15 grid are indicated for nine measuring passes, wherein for better detection of the repeatability, the average value of all nine measuring passes is subtracted from all positions at each grid position.

The results of this measurement, more precisely of each value of the maximum threefold standard deviation (repeatability) are plotted in FIGS. 2A and 2B for the X and Y direction, respectively, against the measuring runs. The first measuring run is indicated as .NA0, the second as .NA1 etc. The position value is indicated in each graphical representation.

One hundred measuring values are taken per measuring run. The result is a repeatability of 1.4 nm in the X coordinate direction and 1.1 nm in the Y coordinate direction in a range of 2.8 nm in the X direction or 2.3 nm in the Y direction, respectively, wherein the range represents the difference between the maximum and minimum values and therefore a measure for the noise band.

A movement of the stage in X/Y coordinate directions is carried out simultaneously with the relative movement of the measuring objective in the Z coordinate direction, wherein a plurality of images are recorded in synchronism. The actual stage position is determined in parallel thereto during the imaging of each individual image. The actual stage position of the recorded images and each synchronously recorded Z position is used for determining the position of the edges of the structure and the structural width. The measuring objective is moved in the Z coordinate direction in a range of several μm. A typical Z traversal is 1.5 μm. The coordinates, the images and the Z positions of the measuring objective, also synchronously recorded, are evaluated for the position determination of the edges (positions) and the structural width (CD). The evaluation of the intensity profiles obtained from the measuring windows is carried out by means of a focusing criterion (the profile at which the image was in focus) and edge determination (where were 0% to 100%). The fit of the edge positions of different images around the image most in focus and the determination of the edge position (for example a 50% criterion) is derived from the intersection of focus criterion and edge fit. The greatest measuring inaccuracy results from the so-called systematic error, which also includes the interferometer error.

Figure 3:
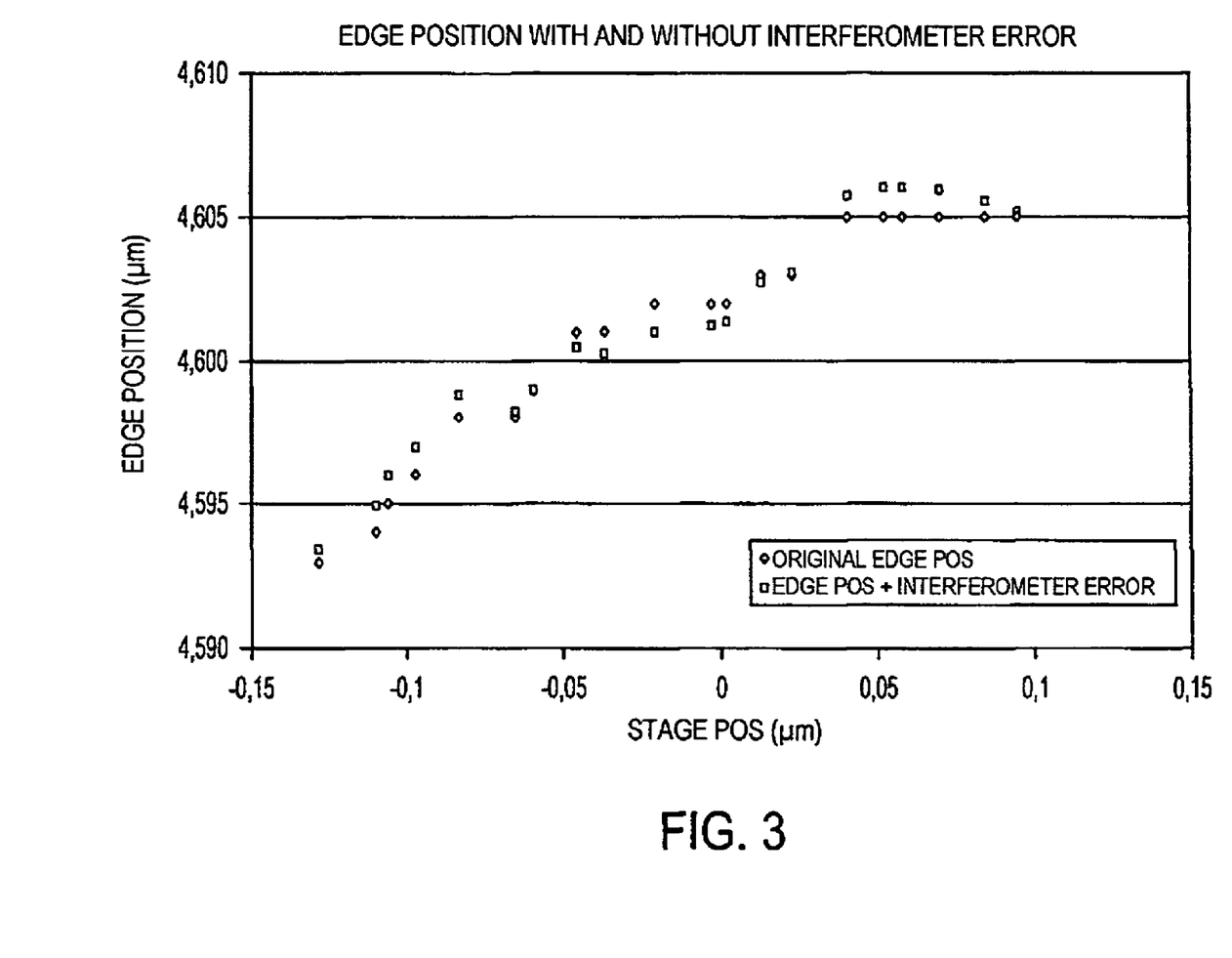
FIG. 3 shows originally measured edge positions during a measuring series with simultaneous stage shift, and the same positions plus a simulated interferometer error with an amplitude of 1 nm.

FIG. 3 shows an originally measured edge position during a measurement, and the same position plus a simulated interferometer error with an amplitude of 1 nm. The focus, i.e. the measuring objective, moves in the Z coordinate direction during the measurement, and the stage is simultaneously moved in the X and Y coordinate directions. A very small distance in the X/Y plane is covered by the movement of the stage. During the measurement of the individual images, the stage deviation from the setpoint position is recorded in parallel to the imaging.

If the interference function solely due to the interferometer error is to be determined, for example, the actual stage position must always be known or determined during imaging. If the edge position from the recorded images is plotted as a function of the stage position, a possible interferometer error should occur as a sinusoidal interference in the measured edge positions. While it is superimposed by the change of the edge position in the image due to the simultaneous focusing movement, it should be able to be filtered out by suitable frequency analysis. FIG. 3 shows the result of a simulation of the interferometer error with the amplitude of 1 nm and a stage movement of 1.5 λ/4.

Figure 4:
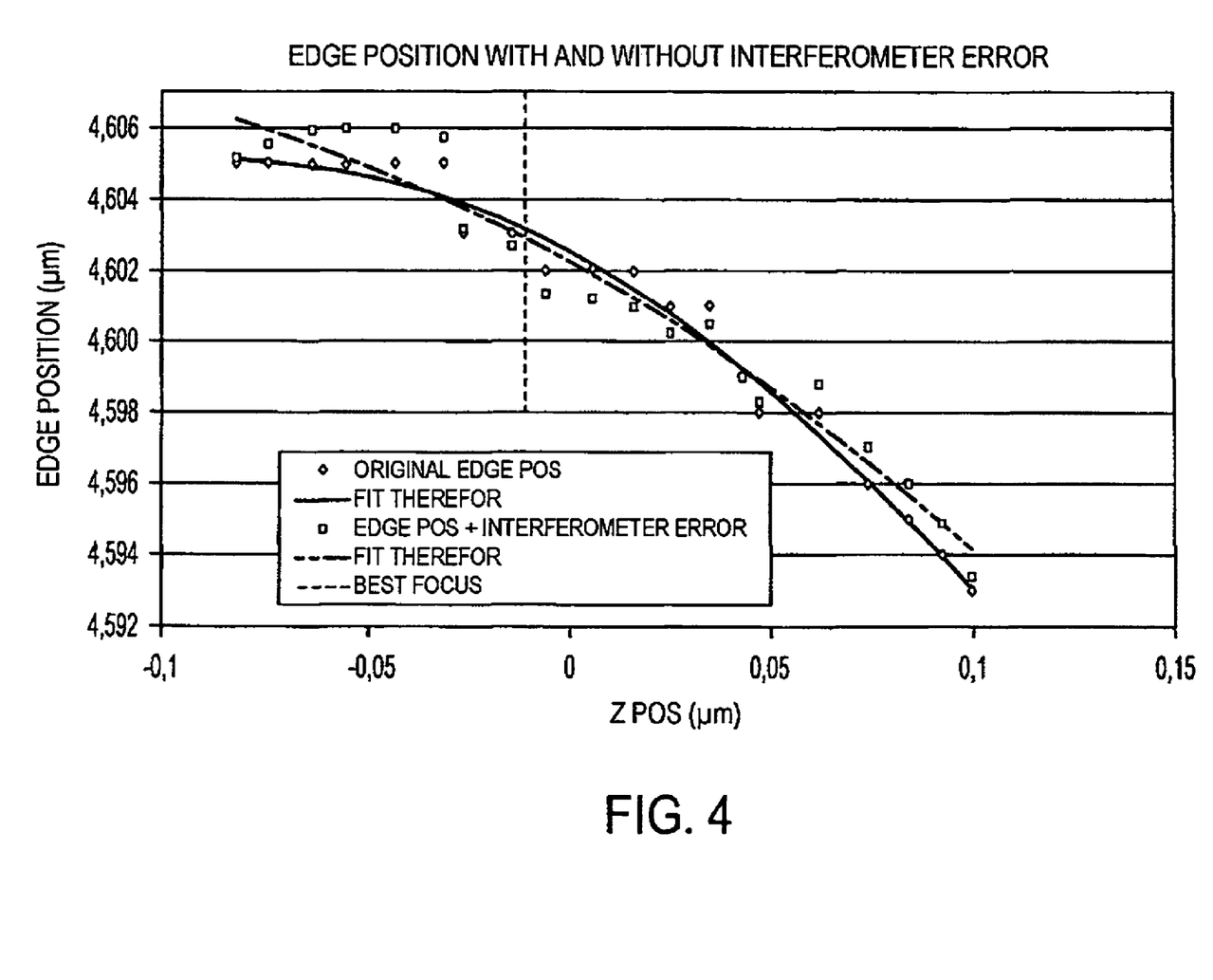
FIG. 4 shows a comparison between the standard evaluation of the originally measured edge data with edge data plus interferometer error, wherein the stage traversal and the interferometer error are as in FIG. 3.

FIG. 4 shows a comparison of the standard evaluation of the originally measured edge positions with the edge positions measured in addition to an interferometer error. Herein, the stage traversal and the interferometer error are the same as in FIG. 3. The parabolic fit for determining the overall position from the positions of the individual images will be able without further changes of the evaluation method to carry out this filtering function. The further the stage moves during imaging the stronger is the filter effect. The above description mentions the interferometer error, but it goes without saying for a person skilled in the art that this error is not the only error occurring during the measurement. The error occurring during the measurement is a systematic error and is composed of a plurality of error sources. These are, for example, the pixel width of the pixels of the CCD chip, the error of the interferometer for determining the stage position, apparatus vibrations, imprecise stage positioning etc.

During the measurement, the measuring objective moves in the Z coordinate direction, and the stage simultaneously moves in the X and Y coordinate directions, so that a (very small) distance, such as in the range of λ/4, is covered. During the measurement of individual images, the stage deviation from the setpoint position is already recorded. The setpoint position of the stage control will be different for each image.

Figure 5:
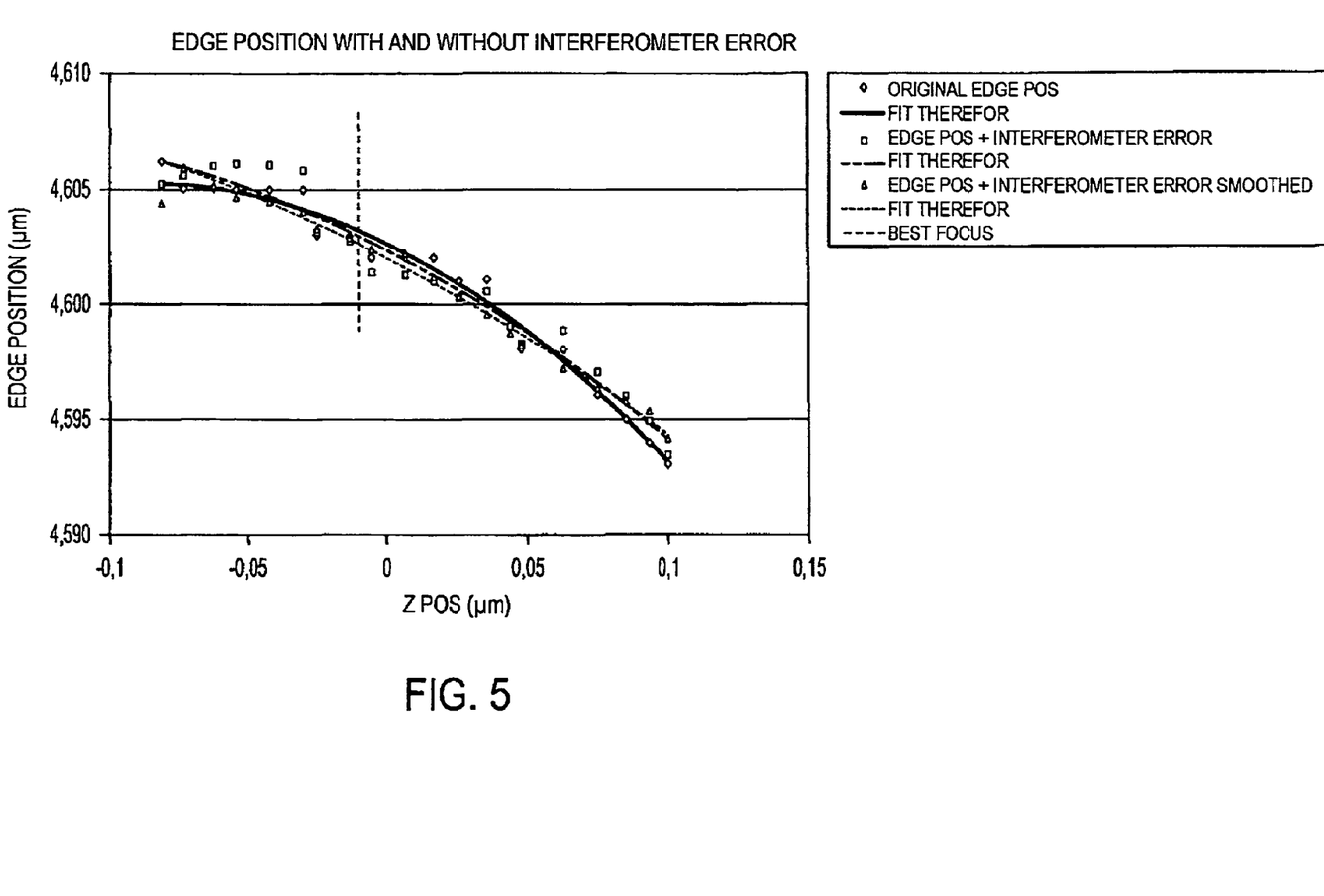
FIG. 5 shows the simulation from FIGS. 3 and 4, wherein these have been complemented by a curve smoothed by an averaging filter having a width of λ/4.

FIG. 5 shows the simulation herefore. The parameters are chosen as in FIGS. 3 and 4. The interferometer error is further reduced to 3σ=0.1 nm (about 4%). There is always the possibility, in particular with very effective filters, that a portion of the useful signal is eliminated and that the edge curve has a systematic error (in this case of 0.5 nm).

Figure 6:
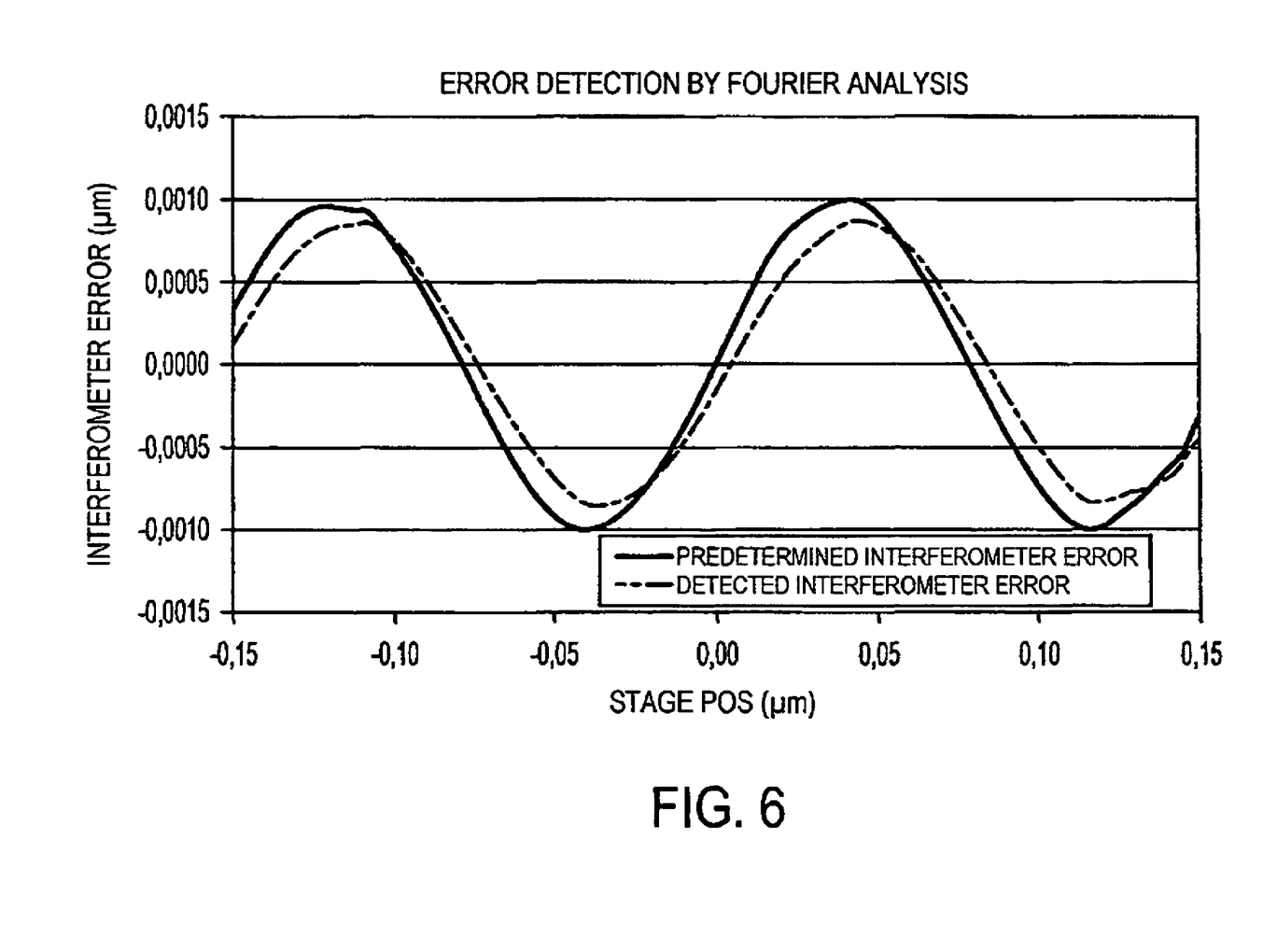
FIG. 6 shows the comparison of the interferometer error predefined in the simulation and the error detected by Fourier analysis.

FIG. 6 shows the comparison of the interferometer error predetermined in the simulation with the error obtained by the Fourier analysis. The Fourier analysis (not FFT) currently appears to be a suitable means as a mathematically precise method for determining the local 4/λ) frequency. Herein, the interference is characterized by: The error is described by:

$$F(x) = a_s f_s(x) + a_c f_c(x)$$

with $$f_s(x) \sin(kx)$$

$$f_c(x) = \cos(kx)$$

$$k = \frac{8\pi}{\lambda}$$

The amplitudes $a_s$ and $a_c$ for $f_s$ and $f_c$ result in:

$$a_s = \frac{2}{x_{end} - x_{start}} \int_{x_{start}}^{x_{end}} p(x) f_s(x) dx$$

$$a_c = \frac{2}{x_{end} - x_{srtat}} \int_{x_{start}}^{x_{end}} p(x) f_c(x) dx$$

Herein, p(x) is the function which results from the interpolation of the edge positions as a function of the stage position.

This method makes it possible to almost fully eliminate a systematic error and consequently the interferometer error. The function F(x) describes the error with a deviation of 15% (see FIG. 7).

Figure 7:
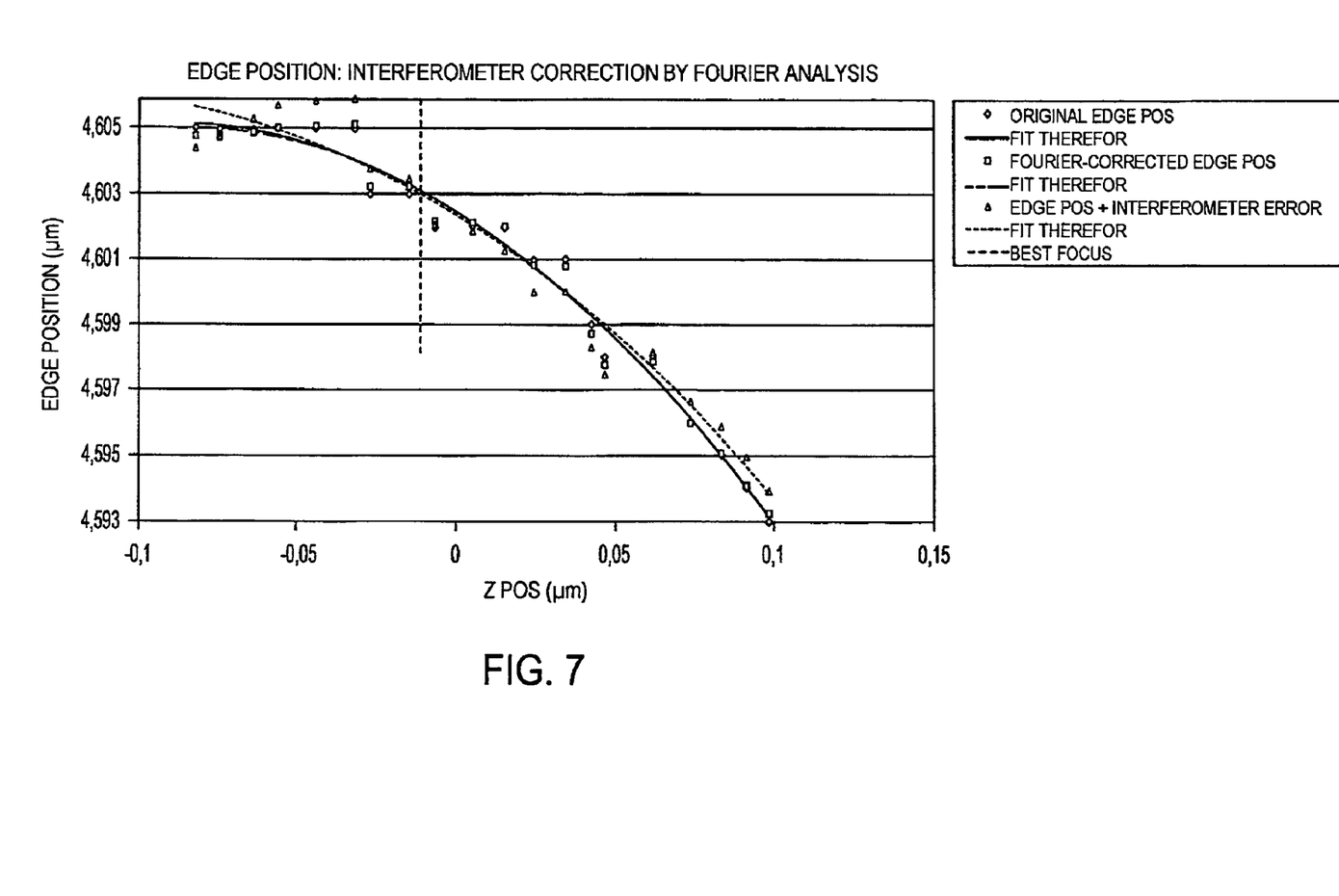
FIG. 7 shows the interferometer correction by Fourier analysis, the originally measured edge positions, the edge positions plus simulated interferometer error, and the Fourier-corrected edge position.
Figure 8:
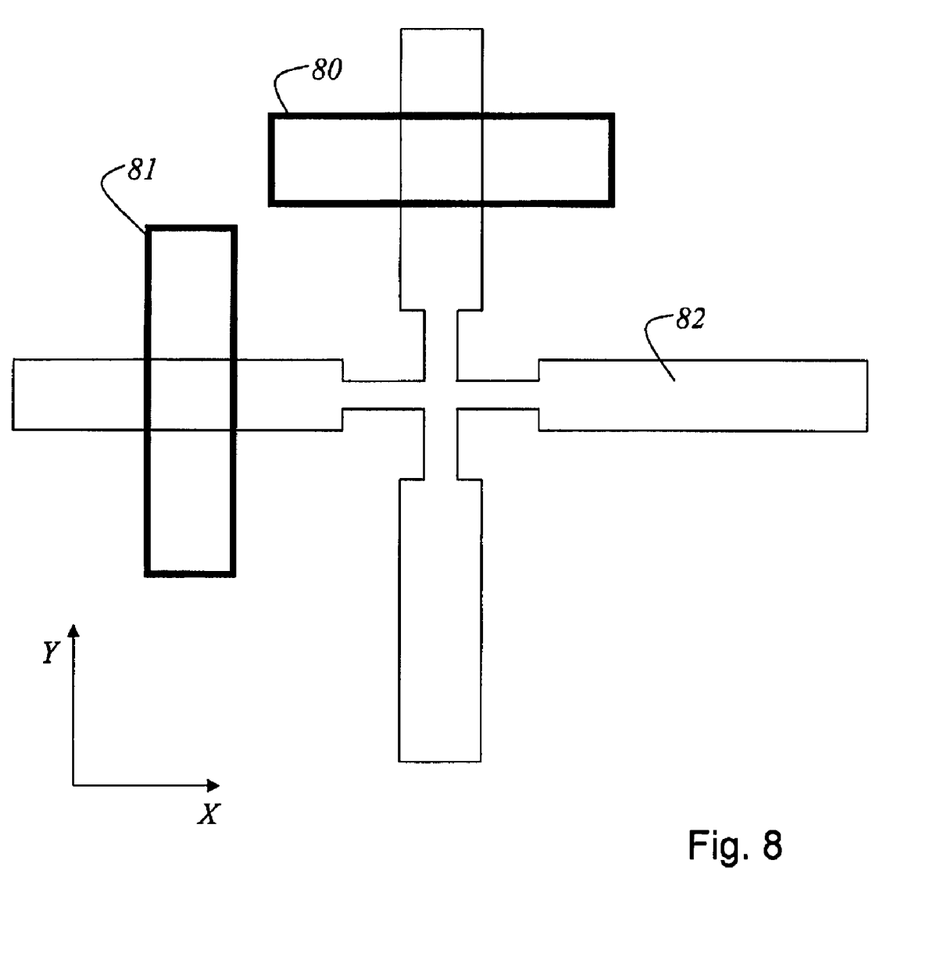
FIG. 8 shows a camera image of a cross structure, wherein two measuring windows are provided for determining the individual coordinates in the X and Y coordinate directions.

In addition to this, there is the filtering effect of the parabolic fit, so that here the interferometer error is reduced to 1%, with a systematic offset of the edge position of only 0.02 nm. In FIG. 7 originally measured edge positions, the edge positions plus interferometer error, and the Fourier-corrected edge positions are indicated. The parabolic fit of the Fourier-corrected edge positions is sufficiently precise that the curve almost perfectly covers the original data.

The traversal speed of the stage during measurement is calculated prior to measurement in the PC software in correspondence to the image frequency, the number of images and the width of the range in which reasonable data can be recorded. These data are then passed on to the control of the X/Y stage. Immediately prior to the start of the measurement, the stage movement is started. The software interface herefore can be completely along the lines of the already implemented traversal algorithm for the TV autofocus.

The traversal of the stage can be in a quasi-continuous manner, with a speed in the range of less than 1 nm per cycle period of the control circuit of 1 ms. Alternatively, the setpoint position of the stage is incremented after each imaging (i.e. in steps of about 40 ms). In this way, the setpoint position can be mathematically tracked on a per image basis, which is of importance for determining the actual stage position.

As before, the stage position must be individually considered for each image when calculating the edge positions.

In a first method, the laser monitor outputs the average stage position during imaging on a per image basis with respect to the position predetermined during job definition. This is how the edge position can be precisely and simply calculated. To check the stage with respect to deviations from the setpoint position, the internal setpoint position of the control must be subtracted from the average stage positions.

What is claimed is:

1. A method for precision measurement of coordinates on a substrate placed on a stage moveable in X/Y coordinate directions comprising the following steps:

recording a plurality of images of a structure on a substrate using a 2-dimensional detector during relative movement of a measuring objective in a Z coordinate direction and simultaneous movement of the stage in the X and Y coordinate directions;

determining an actual stage position in the X coordinate direction and the Y coordinate direction and a measuring objective position of the measuring objective in the Z coordinate direction during the recording of each individual image of the plurality of images and, in parallel hereto, determining each associated edge position of the structure;

adapting a model function to the determined edge positions of the recorded individual images of the structure; and determining at least one edge position at a defined focus position with reference to the model function.

2. The method according to claim 1, wherein the defined focus position is where the measuring objective has an optimum focus position with respect to the imaged structure.

3. The method according to claim 1, wherein an interference function overlaying the model function is determined from the measuring results of the determined edge position to eliminate an effect of the interference function on the measuring values of the measuring results.

4. The method according to claim 3, wherein the interference function is composed of a plurality of components and wherein for determining of sinusoidal components of the interference function a Fourier analysis of the measuring values is carried out.

5. The method according to claim 4, wherein the measure of the relative movement of the measuring objective in the X and Y coordinate directions is between half of a wavelength up to several multiples of the wavelength of the components of the interference function to be expected due to the Fourier analysis.

6. The method according to claim 1, wherein the relative movement of the measuring objective in the Z direction is between several hundreds of nm up to several μm.

7. The method according to claim 1, wherein the images are recorded using the 2-dimensional detector over at least one measuring window of the 2-dimensional detector.

8. The method according to claim 1, wherein a deviation of the edge position and/or the stage position with a period length of $\lambda/4$ or $\lambda/2$, respectively, is due to the interferometer error.

9. The method according to claim 1, wherein the 2-dimensional detector is a chip of a CCD camera.

* * * * *